(12) United States Patent
Sridhar et al.

(10) Patent No.: US 9,014,116 B2
(45) Date of Patent: Apr. 21, 2015

(54) METHODS FOR CONGESTION CONTROL IN WIRELESS NETWORKS

(71) Applicant: Alcatel-Lucent USA Inc., Murray Hill, NJ (US)

(72) Inventors: Kamakshi Sridhar, Plano, TX (US); Peter Busschbach, Basking Ridge, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 140 days.

(21) Appl. No.: 13/719,623

(22) Filed: Dec. 19, 2012

(65) Prior Publication Data

US 2014/0169160 A1    Jun. 19, 2014

(51) Int. Cl.
| | |
|---|---|
| *H04W 4/00* | (2009.01) |
| *H04W 28/02* | (2009.01) |
| *H04W 16/08* | (2009.01) |
| *H04W 24/02* | (2009.01) |

(52) U.S. Cl.
CPC .......... *H04W 28/0289* (2013.01); *H04W 16/08* (2013.01); *H04W 24/02* (2013.01); *H04W 28/0205* (2013.01); *H04W 28/0231* (2013.01)

(58) Field of Classification Search
CPC ................................................ H04W 28/0289
USPC ......................................................... 370/229
See application file for complete search history.

(56) References Cited

U.S. PATENT DOCUMENTS

| | | |
|---|---|---|
| 2010/0075682 A1 | 3/2010 | Del Rio-Romero et al. |
| 2012/0039175 A1 | 2/2012 | Sridhar et al. |
| 2012/0252458 A1 | 10/2012 | Ohnishi |

OTHER PUBLICATIONS

International Search Report and Written Opinion for International Application No. PCT/US2013/072963 mailed May 20, 2014.
Sophia Antipolis, "3rd Generation Partnership Project; Technical Specification Group Services and System Aspects; Telecommunication management; Self-organizing Networks (SON) Policy Network Resource Model (NRM) Integration Reference Point (IRP); Information Service (IS) (Release 11)", 3GPP Draft, Nov. 20, 2012, pp. 1-41.
Sophia Antipolis, "3rd Generation Partnership Project; Technical Specification Group Services and System Aspects; Feasibility study on user plane congestion management (Release 12)", 3GPP Standard, Dec. 14, 2012, pp. 1-36.

*Primary Examiner* — Shripal Khajuria
(74) *Attorney, Agent, or Firm* — Harness, Dickey & Pierce

(57) ABSTRACT

A centralized self optimizing network and policy server is configured to control congestion within at least one cell in a wireless network by coordinating application of radio frequency congestion control mechanisms affecting all users within the cell and application of core network congestion control mechanisms associated with individual users within the cell.

19 Claims, 3 Drawing Sheets

METHODS FOR CONGESTION CONTROL IN WIRELESS NETWORKS

BACKGROUND

Self optimizing network (SON) features for controlling network congestion are generally supported in a distributed fashion (in the base stations) or in a centralized system associated with the Radio Access Network (RAN). On the other hand, congestion control techniques such as video optimization, heavy user throttling, etc. are executed by systems associated with the mobile core network. These solutions are sometimes referred to as policy based functions, and generally take subscriber information and operator policies into account when attempting to mitigate network congestion.

Conventionally, SON features and policy based functions are independent of each other. The independence of these congestion control techniques can have undesired consequences, such as over-compensation and/or instability.

SUMMARY OF THE INVENTION

Self optimizing network (SON) features allow for self optimization of networks in response to network congestion and changing radio network conditions. SON Coverage and Capacity Optimization (CCO) features rely on user equipment (UE) measurements, performance measurement (PM) counters and key performance indicators (KPIs) to determine antenna tilt modifications needed to improve and/or optimize cell coverage and capacity.

In parallel to execution of SON CCO functions, other core network congestion control mechanisms and techniques (also referred to herein as policy based congestion control mechanisms and techniques) may be used to reduce the impact of congestion. These other core network congestion control mechanisms and techniques include, for example, throttling of heavy users, video compression, delay of content download, etc.

Example embodiments provide methods and apparatuses to control congestion by coordinating the actions of the core network congestion control mechanisms and radio frequency congestion control mechanisms (e.g., SON CCO) to ensure a more optimal response to network congestion within a cell.

At least one example embodiment provides a centralized self optimizing network and policy server. According to at least this example embodiment, the server includes a processing device configured to control congestion within at least one cell in a wireless network by coordinating application of radio frequency congestion control mechanisms affecting all users within the cell and application of core network congestion control mechanisms associated with individual users within the cell.

At least one other example embodiment provides a method for congestion control in a wireless network. According to at least this example embodiment, the method includes controlling congestion within at least one cell in the wireless network by coordinating application of radio frequency congestion control mechanisms affecting all users within the cell and application of core network congestion control mechanisms associated with individual users within the cell.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

Figure 1:
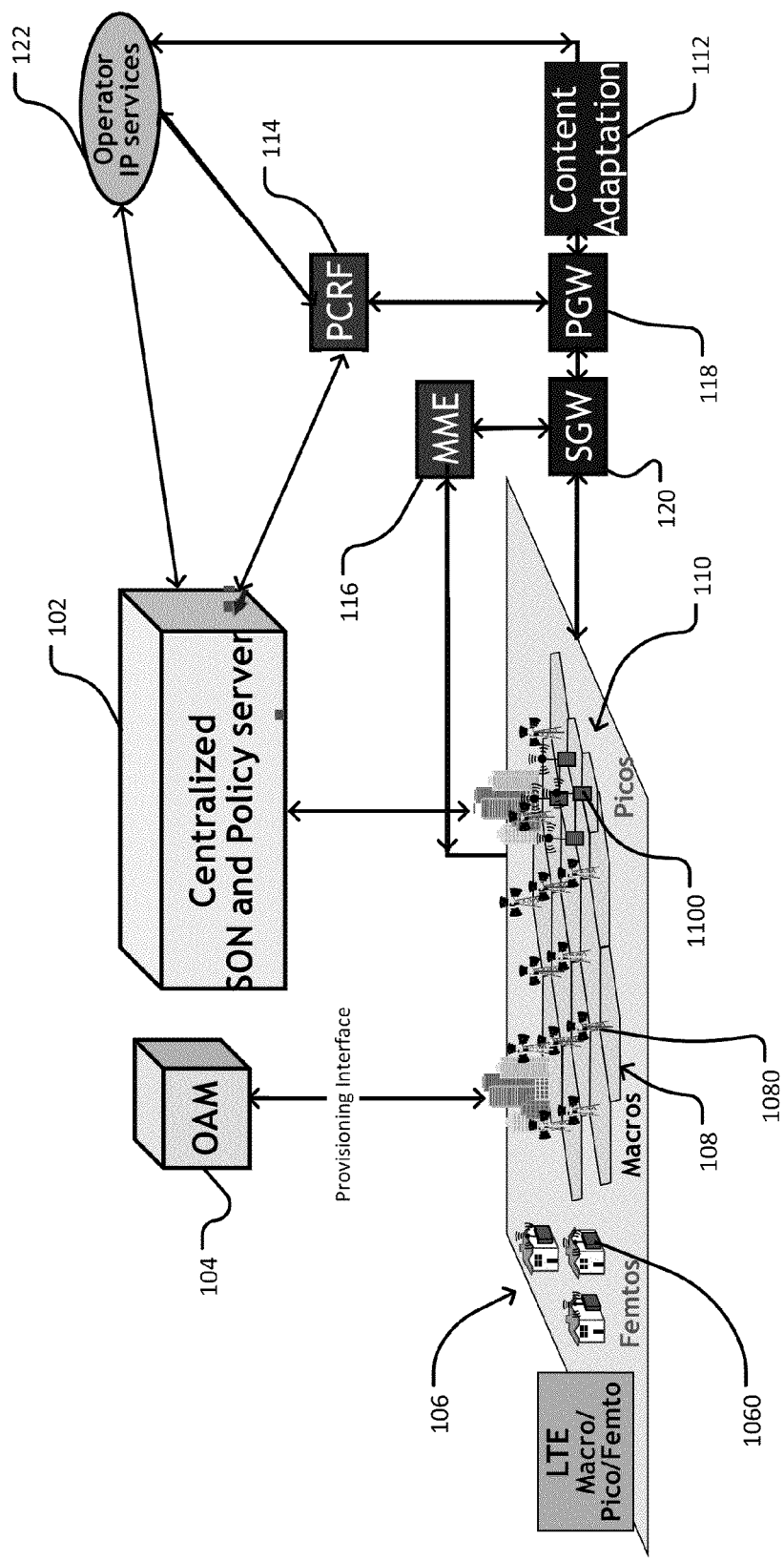
FIG. 1 illustrates a network architecture according to an example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

FIG. 1 illustrates a portion of a network architecture according to an example embodiment. The network architecture shown in FIG. 1 supports a $3^{rd}$ Generation Partnership Project Long Term Evolution (3GPP LTE) radio access network (RAN), but may also or alternatively support a 3G RAN.

The LTE RAN serves a geographic area divided into cells, where user equipments (UEs) in each cell are served by a respective base station (referred to herein as an eNB or eNodeB). The LTE RAN in FIG. 1 is divided into femto cells 106, pico cells 110 and macro cells 108. Each of the femto cells 106 is served by a femto eNB 106O, each of the pico cells 110 is served by a pico eNB 110O, and each of the macro cells 108 is served by a macro eNB 108O.

The core network associated with the RANs includes a radio network controller (not shown) configured to communicate with the eNBs 106O, 108O, 110O. The LTE RAN shown in FIG. 1 includes femto cells, pico cells and macro cells. As is well known, however, LTE RANs may include one or more of femto cells, pico cells and macro cells.

Still referring to FIG. 1, the core network associated with the LTE RAN also includes a signaling gateway (SGW) 120 configured to communicate with the eNBs 106O, 108O, 110O of the LTE RAN via S1-u interfaces. A packet data network gateway (PGW) 118 communicates with the SGW 120, content adaptation node 112, and while not shown, may communicate with other networks such as the Internet.

The content adaptation node 112 uses knowledge of available network resources to modify user content in an effort to meet user expectations for the type of device to which the content is being delivered. For example, the content adaptation node 112 may: (i) modify downstream content to smooth out peak bursts of traffic based on an expectation of the available bandwidth in the downstream nodes; (ii) delay certain portions of the content (e.g., for video delivery) based on available bandwidth; or (iii) remove lower priority information in video content (e.g., P frames as compared to higher priority I frames) in order to help the network deliver the information to the end user more efficiently while still improving network performance.

A mobility management entity (MME) 116 communicates with the eNBs 1060, 1080, 1100 of the LTE RAN via a S1-MME interface. The MME 116 also communicates with the SGW 120 via a S11 interface. It will be appreciated that the network architecture may include more than one radio network controller (RNC), SGW, etc. and additional eNBs associated with the additional core network resources to serve a larger geographic area.

A policy and charging rules function (PCRF) (also referred to as a PCRF node) 114 communicates with both the PGW 118 and a gateway general support node GGSN (not shown). The PCRF 114 may also communicate with a home subscriber server (not shown), and the home subscriber server may further communicate with the MME 116.

As is known, the PCRF 114 determines policy rules in a multimedia network. The PCRF 114 is a part of the core network. The PCRF 114 supports the creation of rules and makes policy decisions for active users on the network. In one example, the PCRF 114 controls quality of service (QoS) rules for the network. Each PCRF 114 has a table that contains user profiles for each user. In one example, the table at the PCRF 114 includes information identifying each user as a gold, silver or bronze user.

Methods for controlling congestion according to at least some example embodiments take into account different user profiles in deciding which users can be metered out with optimizations and to what extent. The output of a centralized SON and policy (CSONP) server 102, which is discussed in more detail below, is combined with outputs from the PCRF 114 to determine the degree of optimizations to which each user should be subjected.

Still referring to FIG. 1, the PCRF 114 also communicates with operator IP services 122.

The operator IP services 122 refer to a suite of content-rich, IP video, voice, data IMS and non-IMS services. Operator IP services 122 enable mobile operators to introduce new, content-rich media services, smart phones and other devices to retain existing subscribers and attract new subscribers, since their revenue is closely tied to new service introduction, service velocity and quality of services offered.

The network architecture shown in FIG. 1 also includes an operations, administration and maintenance (OAM) node 104. The OAM node 104 communicates with the LTE RAN via a provisioning interface.

The OAM node 104 is responsible for the configuration, operations and maintenance of various RAN nodes. Various RAN and core network nodes communicate with the OAM node 104 through northbound interfaces (e.g., provisioning interface) that allow the OAM node 104 to download configuration data to the RAN and core network nodes and to obtain performance statistics from the RAN and core network nodes that indicate the values of various counters used to determine the Key Performance Indicators (KPIs) and raise alarms as needed. Various RAN and core network nodes may be managed through one or more OAM entities.

The core network shown in FIG. 1 also includes a centralized self optimizing network and policy (CSONP) server 102. The CSONP server 102 communicates with the eNBs of the LTE RAN as well as the other nodes of the core network. For example, the CSONP server 102 may communicate with the PCRF 114 and operator IP services 104.

The CSONP server 102 is a network element or entity that enables application of radio frequency congestion control mechanisms (e.g., SON CCO algorithms) and core network congestion control mechanisms (e.g., policy-based functions) to be coordinated at a single network entity. Coordinating application of core network congestion control mechanisms and radio frequency congestion control mechanisms may improve congestion control and provide a more optimal response to network congestion. The operations and functionality of the CSONP server 102 will be described in more detail later.

In one example, the CSONP server 102 may be a conventional server or other computer device including one or more processing devices such as Central Processing Units (CPUs), digital signal processors (DSPs), application-specific-integrated-circuits, field programmable gate arrays (FPGAs), computers or the like, configured to implement the functions and/or acts discussed herein.

The CSONP server 102 may be located in a centralized location in the network, for example, at a layer above the OAM node 104 (element management system). Since the CSONP server 102 coordinates actions across multiple nodes, these multiple nodes communicate with the CSONP server 102 through northbound interfaces that allow each node to send performance counters to a centralized location. From an implementation perspective, the CSONP server 102 may obtain performance counters either directly from the nodes, or through the OAM node 104 that manages the various nodes. A distinction between the OAM node 104 and the CSONP server 102 is that detailed performance calculations needed by SON CCO algorithms to determine optimum values of various parameters are typically performed at the CSONP server 102, while KPI and alarm monitoring functions are performed at the OAM node 104.

Example embodiments may improve and/or optimize the overall customer experience. The overall customer experience may be quantified as a weighted sum of individual customer experiences. In one example, the sum of individual customer experiences may be weighted based on customer lifetime value or fairness principles.

In more detail, for example, the overall customer experience is a function of various optimization levers. A network operator may want to be equally fair to all users in an effort to ensure that all users are assigned equal network resources. Alternatively, a network operator may desire to give greater weight to certain users based on the revenue generated by the particular user. The customer lifetime value is an attribute that indicates the relative value of a particular user to the network from the purposes of revenue generating potential.

Examples of various optimization levers include radio frequency congestion control mechanisms (e.g., SON CCO) and core network congestion control mechanisms (e.g., video optimization, quality of service (QoS)-class modifications, throttling, etc.). Optimization levers, such as radio frequency congestion control mechanisms are sometimes referred to herein as radio frequency optimization levers, whereas optimization levers such as core network congestion control mechanisms are sometimes referred to herein as core network optimization levers. Radio frequency congestion control mechanisms impact all users in a given cell, whereas core network congestion control mechanisms affect individual users. In other words, core network congestion control mechanisms may be applied on a per user basis.

Example embodiments attempt to maximize user experience as a function of the optimization levers given current network conditions and operator policies.

In one example, radio frequency congestion control mechanisms (or radio frequency optimization levers) include adjusting antenna tilt within a cell. In this example, cooperation and coordination between the radio frequency congestion control mechanisms and core network congestion control mechanisms at a single network entity or node (e.g., the CSONP server 102) results in a coordinated action whereby an updated antenna tilt value within a cell is computed based on the degree of congestion as well as, for example: the number of users per subscription class in the cell where congestion is observed and/or detected; the number of users per subscription class in one or more neighboring cells; the degree of congestion in one or more neighboring cells; the current state of core network optimization levers; and operator policies that may state a preference for the execution of one optimization lever over another, in general or with respect to a particular subscription class. Core network optimization levers may also be referred to herein as policy-based congestion response mechanisms.

A current state of core network optimization levers refers to the progress of the core network optimization process since initiating a particular optimization lever used to respond to core network congestion. After invoking each core network optimization lever, there is a period of time during which the network responds to the set of policies associated with that lever. In response to congestion warnings, certain actions are taken within the network to free up bandwidth. During that time period, performance measurements obtained from the network should indicate continued easing of congestion until the network is able to backoff from exercising the optimization lever. At any given time, different optimization levers may be in different states, depending on when they were instantiated.

According to at least one example embodiment, the CSONP server 102 computes the updated antenna tilt for a cell to optimize a weighted cost function. Calculation of the updated antenna tilt will be discussed in more detail later with regard to FIG. 3.

After the CSONP server 102 computes the updated antenna tilt value for a given cell, the CSONP server 102 communicates the computed antenna tilt to the PCRF 114. In response to receiving the computed antenna tilt, the PCRF 114 delays any changes in policy-based functions for users affected by the antenna tilt adjustment (e.g., users within the cell) for at least the next few cycles until the antenna changes have taken effect.

Figure 2:
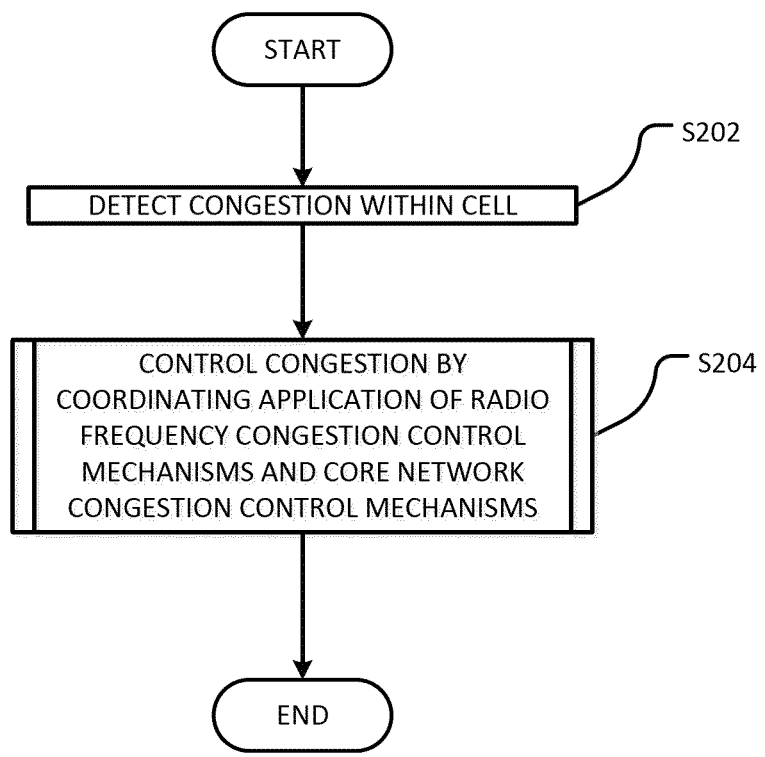
FIG. 2 illustrates an example embodiment of a method for congestion control in a wireless network.

FIG. 2 is a flow chart illustrating an example embodiment of a method for controlling congestion in a wireless network. The example embodiment shown in FIG. 2 will be discussed with regard to the network architecture shown in FIG. 1. However, it should be understood that methods according to example embodiments may be implemented in other networks.

Moreover, a specific example will be discussed with regard to the macro cell 108 and the macro eNB 1080. However, it should be understood that the CSONP server 102 may have the same or similar interactions with the other eNBs shown in FIG. 1.

In the method shown in FIG. 2, the CSONP server 102 controls congestion within at least one cell in the wireless network by coordinating application of radio frequency congestion control mechanisms affecting all users within the cell and core network congestion control mechanisms associated with individual users within the cell.

Referring to FIG. 2, at step S202 the CSONP server 102 detects congestion within at least the macro cell 108.

The CSONP server 102 may detect congestion in the air interface and/or in the core network (backhaul or core network) using tools such as Wireless Network Guardian or through IP/MPLS inline monitoring protocols that can detect packet delay and packet loss on individual flows and estimate if certain flows are experiencing excessive unacceptable packet performance. Because these methods for detecting network congestion are well-known, a more detailed discussion is omitted.

In response to detecting congestion in the macro cell 108, at step S204 the CSONP server 102 controls the detected congestion by coordinating application of radio frequency congestion control mechanisms affecting all users within the cell and application of core network congestion control mechanisms associated with individual users within the cell. In at least this example embodiment, the radio frequency congestion control mechanisms include, for example, adjusting antenna tilt at the macro eNB 1080, whereas core network congestion control mechanisms include, for example, policy-based congestion response mechanisms (or core network optimization levers) such as throttling of heavy users, video compression, delay of content download, etc.

Throttling of heavy users involves reducing the value of the maximum guaranteed bit rate (GBR) to a lower value so the downstream load on the network and backhaul is reduced and more bandwidth available to other users. Video compression involves compressing video bits so that fewer bits are sent to communicate the video information. Delay of content download involves delaying content delivery until congestion in the network has decreased to an appropriate level. Although only policy-based congestion response mechanisms such as throttling of heavy users, video compression, delay of content download are discussed herein, example embodiments should not be limited to these examples.

As is known, modifying and/or adjusting antenna tilt within a cell is used to adjust coverage and capacity of the network within the cell. For example, up-tilt of an antenna within a cell may increase network coverage while decreasing network capacity. On the other hand, down-tilt of an antenna within the cell may decrease cell coverage while increasing network capacity within the cell. As is known, antenna tilt may be adjusted electrically and/or mechanically. Because methods for adjusting antenna tilt are well-known, a detailed discussion is omitted.

Figure 3:
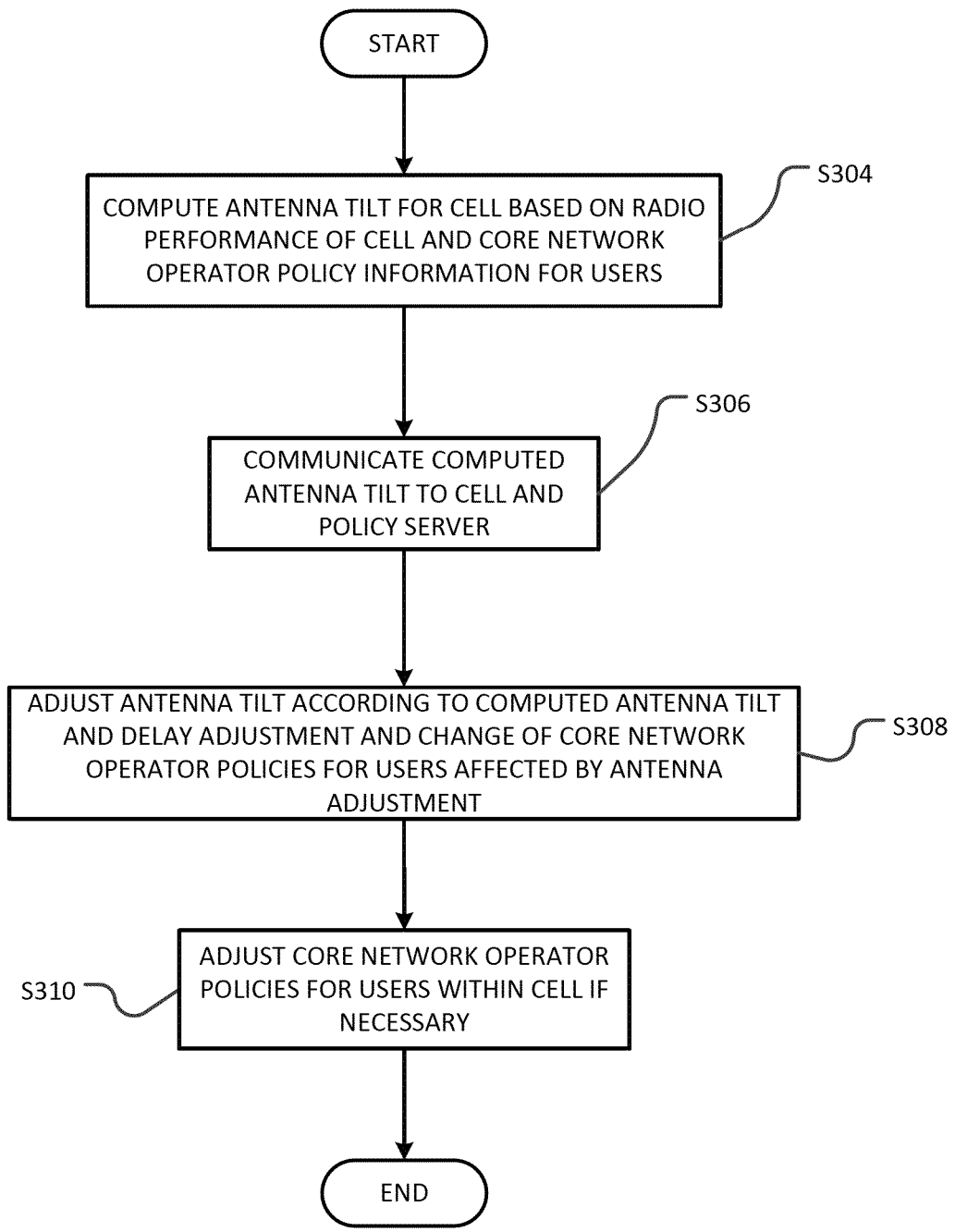
FIG. 3 illustrates an example embodiment of step S204 in more detail.

FIG. 3 is a flow chart illustrating an example embodiment of step S204 in more detail. As with FIG. 2, the example embodiment shown in FIG. 3 will be discussed with regard to the network architecture shown in FIG. 1. However, it should be understood that methods according to example embodiments may be implemented in other networks.

Referring to FIG. 3, in response to detecting network congestion at step S202, at step S304 the CSONP server 102 computes an updated antenna tilt for the macro cell 108 based on the radio performance of the macro cell 108, core network operator policy information, and a degree of congestion in at least one neighboring cell.

The radio performance of the macro cell 108 may be determined based on at least one of: (i) a number of guaranteed bit rate (GBR) users within the macro cell 108; (ii) a number of non-GBR users within the macro cell 108; (iii) a number of users per subscription class (e.g., the number of gold, silver and bronze users) in the macro cell 108; and (iv) performance indicators (e.g., KPIs) for the wireless network. In one example, the performance indicators may include at least one of handover performance for each of the macro cell 108 and neighboring cells (dropped calls for the aggregate streams within the cells), delay, packet loss, jitter, and throughput in the macro cell 108.

Radio performance can be detected in the RAN nodes (eNB) by examining various transmission characteristics and metrics sent by users that indicate uplink/downlink throughputs and packet loss, round trip delay based on the packet numbering and time stamped information contained in each packet. Because methods for detecting/determining radio performance are well-known, a more detailed discussion is omitted.

A degree of congestion in at least one neighboring cell may be characterized by, for example, delay, packet loss, jitter, throughput in a neighboring cell, or a combination of these.

According to at least some example embodiments, the core network operator policy information may include at least one of: (i) subscription class characteristics for at least one of the cell and a neighboring cell, and (ii) a current state of core network optimization levers within the wireless network.

Examples of subscription class characteristics include the following: in a given cell, the gold users may have a certain delay budget, the bronze users may have a less restrictive delay budget. Similar constraints for gold, silver and bronze users may be defined for the packet loss and throughput metrics.

Still referring to step S304, in a more specific example the updated antenna tilt $AT_{UPD}$ may be calculated according to Equation (1) shown below.

$$AT_{UPD} = w_1 * TH_{DL} + w_2 * TH_{UL} + w_3 * HFR_{sec} + w_4 * HFR_{neigh} + w_5 * \#\_CALL\_REJ + w_6 * MECH\_ST_1 + w_7 * MECH\_ST_2 + w_8 * MECH\_ST_3 + \ldots + w_M * MECH\_ST_N \quad (1)$$

In Equation (1), $TH_{UL}$ is the uplink throughput within the macro cell 108, $TH_{DL}$ is the downlink throughput within the macro cell 108, $HFR_{sec}$ is the handover failure rate within the macro cell 108, $HFR_{neigh}$ is the handover failure rate in one or more neighboring cells, and $\#\_CALL\_REJ$ is the number of call admission attempts rejected at the air interface of the macro cell 108 (this is an indication of the air interface congestion). Each of $MECH\_ST_1$ through $MECH\_ST_N$ represent a state of a core network optimization lever (or policy-based congestion response mechanism). As discussed above, examples of core network optimization levers include throttling of heavy users, video compression, delay of content download, etc.

Each of $w_1$ through $w_M$ is a weight assigned to a given factor by a network operator based on importance of each factor.

Each of these weights may be weighted equally (e.g., assigned a weight of 1) or differently as desired by a network operator. The network operator may assign weights according to network priorities as discussed above with regard to, for example, Equation (1).

In one example, a network operator may only be concerned with DL throughput and handover failure rates. In this example, $w_1 = 0.5$, $w_3 = 0.25$, and $w_4 = 0.25$, and the other weights are assigned a weight of 0. In another example situation (e.g., a stadium application with users uploading data to the network), each of the factors may be weighted equally. For example, if there are a total of 10 factors, then each may be weighted 0.10.

The relative weights (e.g., $w_1$, $w_2$, $w_3$, $w_4$, etc.) for each of the radio performance factors may be set to a default of equal weights, but are configurable by a network operator. For example, in an area with a relatively large number of guaranteed bit-rate (GBR) users (e.g., video users), the jitter criterion may be weighted more than the delay criterion. In another example, in an area with a relatively large number of voice users, the number of dropped calls may be weighted more than the delay criterion.

Returning to FIG. 3, at step S306 the CSONP server 102 communicates the computed antenna tilt to the macro eNB 1080 and the PCRF 114. The CSONP server 102 may communicate the updated antenna tilt to the macro eNB 1080 and the PCRF 114 in any well-known manner.

At step S308 the macro eNB 1080 adjusts the antenna tilt within the macro cell 108 according to the computed antenna tilt received from the CSONP server 102. The macro eNB 1080 may adjust the antenna tilt electrically and/or mechanically in any well-known manner.

Also at step S308, in response to receiving the updated antenna tilt, the PCRF 114 delays application (or further application) of core network congestion control mechanisms for users affected by the antenna tilt adjustment at the macro cell 108 (e.g., users being served by the macro eNB 1080 and/or within the macro cell 108). In one example, the PCRF 114 delays any adjustment of current core network operator policies for users affected by the antenna adjustment at the macro cell 108 (e.g., users being served by the macro eNB 1080 and/or within the macro cell 108). In other words, the PCRF 114 maintains the current core network operator policies for users affected by the antenna adjustment at least until the antenna adjustment takes effect within the macro cell 108.

In one example, the PCRF 114 may set a timer or other counter to maintain the current core network operator policies for users within the macro cell 108 for a given, desired or predetermined number of cycles and/or until the changes in antenna tilt within the macro cell 108 take effect. This wait or delay period may be referred to as a delay interval or delay period.

The interval time during which the core network policies are executed depends on the application. For video applications that typically tend to be longer in duration, these core network policies are enforced periodically from times ranging from a few minutes to a few tens of minutes. This gives adequate time for these policies to take effect throughout the network, without resulting in instabilities. Sometimes various applications within a RAN may be cyclical (e.g., may be operating nearly in sync). For example, users watching a football game in a stadium may all be downloading data during the interval time, and then not download again for some period of time, and then download again during the end of the quarters. These cycles of user behavior is used to determine the periodicity of the network optimizations.

After expiration of the delay period, at step S310 the PCRF 114 applies core network congestion control mechanisms for the users within the macro cell 108 as necessary to further control congestion in the macro cell 108. In one example, the PCRF 114 adjusts the core network operator policies for the users within the macro cell 108 as necessary to further control congestion in the macro cell 108. The PCRF 114 may adjust the core network operator policies in any well-known manner. Because methods for adjusting core network operator policies are well-known in the art a detailed discussion is omitted.

By taking into account at least radio performance and core network operator policy information when computing updated antenna tilt values, and then delaying application of core network congestion control mechanisms after applying an updated antenna tilt value, the application of radio frequency congestion control mechanisms and core network congestion control mechanisms are coordinated to control congestion.

Example embodiments provide methods and apparatuses for coordinated congestion control. The coordinated congestion control methods and apparatuses may improve user experience and/or network performance.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A method for congestion control in a wireless network, the method comprising:
controlling congestion within at least one cell in the wireless network by coordinating application of radio frequency congestion control mechanisms affecting all users within the cell and application of core network congestion control mechanisms associated with individual users within the cell, the controlling step including,
applying the radio frequency congestion control mechanisms affecting all users within the cell,
delaying application of the core network congestion control mechanisms for users within the cell for a delay interval during which the applied radio frequency congestion control mechanisms take effect within the cell,
determining, after expiration of the delay interval, whether to apply the core network congestion control mechanisms for the users within the cell, and
selectively applying the core network congestion control mechanisms for the users within the cell based on the determining step.

2. The method of claim 1, further comprising:
detecting the congestion within the at least one cell; and wherein
the congestion is controlled in response to the detecting step.

3. The method of claim 1, wherein:
the controlling step further includes computing an updated antenna tilt value for the cell based on a radio performance of the cell and core network operator policy information for users within the cell; and
the applying step includes adjusting an antenna tilt in the cell based on the updated antenna tilt value.

4. The method of claim 3, wherein the updated antenna tilt value is computed based on the radio performance of the cell, the core network operator policy information, and a degree of congestion in at least one neighboring cell.

5. The method of claim 3, wherein the core network operator policy information includes at least one of: (i) subscription class characteristics for at least one of the cell and a neighboring cell, and (ii) a current state of core network optimization levers within the wireless network.

6. The method of claim 5, wherein the core network optimization levers include at least one of throttling of users, video compression and delay of content download.

7. The method of claim 3, wherein the radio performance of the cell is determined based on at least one of: (i) a number of guaranteed bit rate users within the cell, (ii) a number of non-guaranteed bit rate users within the cell, (iii) a number of users per subscription class in the cell, and (iv) performance indicators for the wireless network.

8. The method of claim 7, wherein the performance indicators include at least one of handover performance, delay, packet loss, jitter, and throughput within the wireless network.

9. The method of claim 3, wherein the radio performance of the cell is determined based on transmission metrics from users within the cell.

10. The method of claim 3, further comprising:
informing a policy server of the updated antenna tilt value; and wherein
the delaying step delays application of the core network congestion control mechanisms for users affected by the antenna tilt adjustment at least until the antenna adjustment takes effect within the cell.

11. A centralized self optimizing network and policy server comprising:
a processing device configured to control congestion within at least one cell in a wireless network by coordinating application of radio frequency congestion control mechanisms affecting all users within the cell and application of core network congestion control mechanisms associated with individual users within the cell, the coordinating of the application of radio frequency congestion control mechanisms and the application of core network congestion control mechanisms including,
applying the radio frequency congestion control mechanisms affecting all users within the cell,
delaying application of the core network congestion control mechanisms for users within the cell for a delay interval during which the applied radio frequency congestion control mechanisms take effect within the cell,
determining, after expiration of the delay interval, whether to apply the core network congestion control mechanisms for the users within the cell, and
selectively applying the core network congestion control mechanisms for the users within the cell based on the determining.

12. The server of claim 11, wherein the processing device is further configured to detect the congestion within the at least one cell, and wherein the congestion is controlled in response to the detected congestion.

13. The server of claim 11, wherein:
the processing device is further configured to compute an updated antenna tilt value for the cell based on a radio performance of the cell and core network operator policy information for users within the cell; and
the applying the radio frequency congestion control mechanisms includes adjusting an antenna tilt in the cell based on the updated antenna tilt value.

14. The server of claim 13, wherein the updated antenna tilt value is computed based on the radio performance of the cell, the core network operator policy information, and a degree of congestion in at least one neighboring cell.

15. The server of claim 13, wherein the core network operator policy information includes at least one of: (i) subscription class characteristics for at least one of the cell and at least one neighboring cell, and (ii) a current state of core network optimization levers within the wireless network.

16. The server of claim 15, wherein the core network optimization levers include at least one of throttling of users, video compression and delay of content download.

17. The server of claim 13, wherein the radio performance of the cell is determined based on at least one of: (i) a number of guaranteed bit rate users within the cell, (ii) a number of non-guaranteed bit rate users within the cell, (iii) a number of users per subscription class in the cell, and (iv) performance indicators for the wireless network.

18. The server of claim 17, wherein the performance indicators include at least one of handover performance, delay, packet loss, jitter, and throughput within the wireless network.

19. The server of claim 13, wherein the radio performance of the cell is determined based on transmission metrics from users within the cell.

* * * * *